United States Patent Office 3,446,960
Patented May 27, 1969

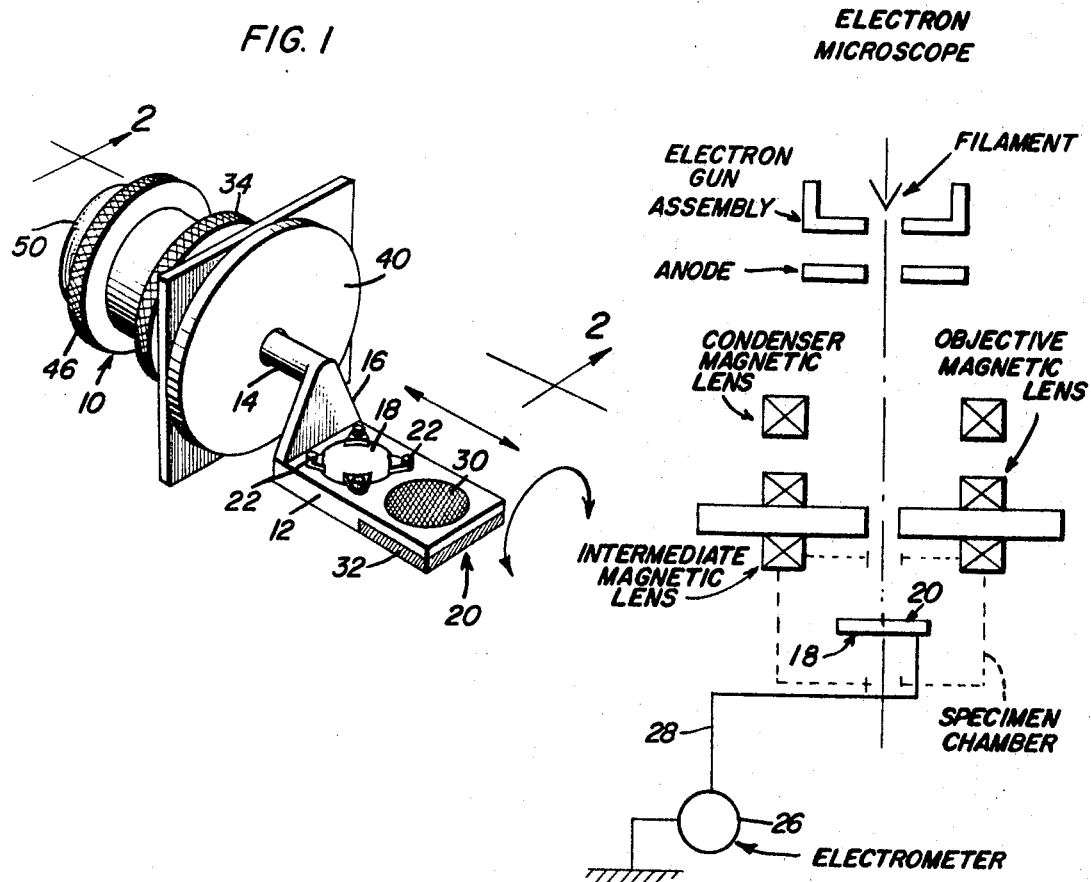
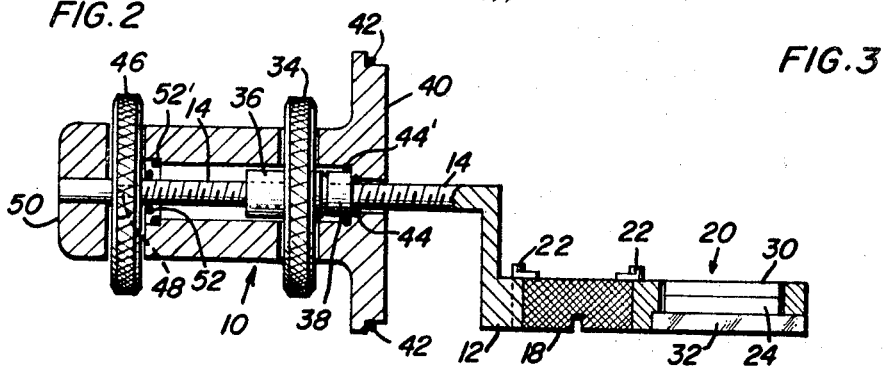
Thomas P. Sciacca
Alfred G. Eubanks
INVENTORS

3,446,960
DEVICE FOR MEASURING ELECTRON-BEAM INTENSITIES AND FOR SUBJECTING MATERIALS TO ELECTRON IRRADIATION IN AN ELECTRON MICROSCOPE
Thomas P. Sciacca, Laurel, and Alfred G. Eubanks, Kensington, Md., assignors to the United States of America as represented by the Administrator of the National Aeronautics and Space Administration
Filed Aug. 30, 1965, Ser. No. 483,891
Int. Cl. H01j 37/26
U.S. Cl. 250—49.5    16 Claims

ABSTRACT OF THE DISCLOSURE

This invention relates to apparatus, employed in conjunction with an electron microscope, for positioning and/or retaining optical detectors, electrical detectors, or materials (samples) in the microscope which intercept the electron beam. A readily removable probe assembly is adapted to have a first portion which extends into the specimen chamber of the electron microscope and a second portion which remains external to the specimen chamber for supporting a pair of controls. Positioned upon a platform member of the first portion is a specimen holder and a detector. Both an electrical and an optical detector are utilized. The specimen holder includes electrical retaining grounding clips. The detector includes a collector plate positioned immediately below a negatively biased grid for yielding an electrical indication of the electron flux. A fluorescent screen produces a visual indication of the beam location. The rotation of a wheel on the second portion of the probe assembly will cause axial movement of the platform member. Similarly, rotation of a second wheel will permit rotational movement of the platform member. Accordingly, the manipulation of the pair of wheels will permit the detector to be positioned to intercept the electron beam. After the detector is centered in the beam and the microscope adjusted to yield the desired intensity, the wheels are rotated so that the specimen in the specimen holder replaces the detector in the electron beam.

The invention described herein may be manufactured and used by or for the Government of the United States of America for governmental purposes without the payment of any royalties thereon or therefor.

This invention relates to a method and apparatus for irradiating specimens or samples with an electron beam irradiation source and more specifically to a method and apparatus for permitting the utilization of an electron microscope as the electron irradiation source.

The present invention relates to a novel apparatus for use in the electron bombardment of materials by an electron microscope for supplying the beam of bombarding electrons. With the device incorporated in an electron microscope, the electron beam current can be conveniently and accurately monitored so that irradiation rates of materials under test and dosages can be closely controlled and observed.

Heretofore, the electron microscope has not been utilized for electron radiation although this instrument provides a ready and controllable source of electrons. The usual equipment employed for subjecting materials to electron bombardment is complex and expensive, such as Van de Graaff generators and linear accelerators. The operation of this equipment is difficult and requires a skilled operator. Further, the maintenance of such equipment is expensive and time-consuming.

Satellites and other space vehicles are subjected to electron bombardment of various energy levels while in orbit; therefore, in order to predict mission life and mission stability it is necessary to be able to study and observe materials in an environment closely simulating the environment of outer space. This invention permits one to simulate two space conditions, namely, the vacuum or reduced pressure of outer space and the electron bombardment to which space vehicles are subjected.

Accordingly, it is the principal object of the present invention to improve methods and apparatus for irradiating objects.

It is a further object of the present invention to improve methods and apparatus for irradiating objects with an electron beam of known intensity.

It is a further object of the present invention to simplify the method for supplying an electron beam source for irradiation procedures.

It is a further object of the present invention to provide an apparatus readily adaptable to cooperate with an electron microscope for supplying an electron beam irradiation source.

It is a further object of the present invention to provide an apparatus readily adaptable to cooperate with an electron microscope for electrically determining the beam location and intensity in an electron microscope irradiation source.

It is a further object of the present invention to provide an apparatus readily adaptable to cooperate with an electron microscope for visually indicating the beam location in an electron microscope irradiation source.

It is a further object of the present invention to provide an apparatus, readily adaptable to cooperate with an electron microscope, which supports a beam detector and specimen holder for readily locating the electron beam and irradiating the specimen, respectively.

It is a still further object of the present invention to provide an apparatus, readily adaptable to cooperate with an electron microscope, which supports a beam detector and specimen holder for readily locating the electron beam and irradiating the specimen, the re-positioning being accomplished by rotating and translating the apparatus about and along an axis so as to replace the detector in the beam with the specimen, without altering the pressure condition of the system.

It is a further object of the present invention to provide an inexpensive, rapid means for bombardment of materials with electrons of closely controlled energy levels and flux densities.

It is another object of the present invention to accurately monitor electron flux densities during the irradiation of materials.

It is a still further object of the present invention to provide a system which is compatible with the geometry and function of an electron microscopic electro-optical system.

These and other objects of the present invention are accomplished by providing a composite probe having a housing with a shaft extending therethrough. One end of the shaft supports a platform in spatial relationship to the housing. A first wheel is positioned upon the housing and concentric with the shaft and rotation of the wheel causes the axial displacement of the platform affixed to the shaft. A second wheel is positioned near the end of the housing and concentric to the shaft for providing rotational movement of the shaft and platform affixed thereto.

The platform has a pair of apertures positioned thereon in side-by-side relationship i.e., a unified structure. One of the apertures is adapted to receive the specimen or sample to be irradiated. The other aperture is adapted to receive electrical and visual detector means for locating and centering the electron beam. The visual detector includes a fluorescent material which emits light upon irradiation by the electron beam while the electrical detector includes a collector plate and a negatively biased grid which serve as a detector for providing an input to a meter which indicates the electron flux density. The platform is inserted into the chamber of the electron microscope and seals are provided upon the housing for maintaining a vacuum within the electron microscope apparatus.

After the beam is located and centered through rotation of the rotational and axial adjustment wheels, the wheels can further be operated to replace the detecting means with the sample or specimen to be irradiated. The sample can now be irradiated and the flux density monitored for the prescribed period of time.

Thereafter, the conversion of the electron microscope from the materials irradiating geometry as taught by the present invention to that of its normal microscopy functions and diffracting geometry is accomplished rapidly and without any permanent alterations to the electron microscope apparatus and equipment.

The invention both as to its organization and method of operation together with further objects and advantages thereof will best be understood by reference to the following specification taken in conjunction with the accompanying drawings in which:

FIGURE 1 is a perspective view of the probe and clearly illustrates the housing, the specimen and detector areas and the wheels for accomplishing movement of the specimen and detector platform;

FIGURE 2 is a sectional view taken along the line 2—2 of the FIGURE 1 and shows the means by which rotation and axial alignment of the shaft supporting the platform is accomplished; and FIGURE 3 is a schematic view of an electron microscope and illustrates the position of the platform of the probe of the FIGURES 1 and 2.

With reference to the FIGURES 1 and 2, a probe assembly is shown and illustrated completely assembled and ready for installation in the electron microscope column of the FIGURE 3. The probe assembly includes a housing 10 having a platform member 12 joined to a shaft 14, the shaft 14 being threaded for a portion of its length and positioned for rotational and axial movement within the housing 10. The platform member 12 is supported from the shaft 14 by a triangular section 16, best illustrated in the FIGURE 1.

The platform member 12 includes a specimen or sample holder 18 and a detector 20 in side-by-side relationship. The specimen holder 18 includes a plurality of retaining clips 22 which are employed for retaining a specimen in position and which are electrically grounded to the platform member 12 (and the probe assembly) in order to dissipate an electrical charge build-up on non-conducting materials being irradiated by an electron beam when the probe assembly is positioned in the electron microscope column of the FIGURE 3.

The detector 20 includes both an electrical detector and an optical detector. The electrical detector is employed to determine the electron flux density and comprises a metallic collector plate 24 which would be coupled to a current measuring device, for example, an electrometer 26, external to the irradiation environment of the specimen chamber in the electron microscope. A metallic conductor 28 between the collector plate 24 and the current measuring instrument 26 permits the detection of the current flowing in the collector plate, the current flow being a direct function of the number of electrons impinging on the surface of the collector plate 24. Positioned directly above the collector plate 24 is a grid 30 upon which a negative electrical bias is applied which minimizes primary electron reflections and secondary electron emissions of the electrons impinging upon the collector plate 24. While the collector plate 24, in conjunction with the grid 30, is coupled to the electrometer 26 for indicating the beam current, a fluorescent screen 32 is positioned below the collector plate 24.

The flourescent screen 32 is sensitive to electrons and will fluoresce in the visible spectrum during electron bombardment. Thus, with the screen 32 being positioned so that the electron beam impinges thereon, a visual indication of the electron beam location is presented by the fluorescent screen 32. The screen 32 is included in order to permit alignment of the specimen in the specimen holder 18 with respect to the electron beam of the electron microscope of the FIGURE 3.

The shaft 14, and the platform member 12 supporting the specimen holder 18 and the detector 20, can be rotated about its axis and also translated axially by means positioned within or adjacent the housing 10. For example, a wheel 34 is affixed to a sleeve 36 which is internally threaded so as to mate with the threads of the shaft 14. The sleeve 36 is coupled for rotational movement with a collar 38 which may be secured to a fore-part 40 of the housing 10. Rotation of the wheel 34 will cause axial translation (back and forth movement as viewed in the FIGURE 2) of the platform member 12. It will be readily evident to those skilled in the art that a number of different arrangements are available for producing axial movement of the shaft 14. For example, the sleeve 36 could be secured to a smooth shaft 14 and the sleeve 36 could be externally threaded so as to mate with internal threads of the wheel 34. Similarly, a number of different arrangements are available in regard to the rotation and/or connection of the sleeve 36 and the collar 38.

Since the specimen chamber of the electron microscope of the FIGURE 3 and in which the probe is inserted must be maintained at a reduced pressure, seals are provided as shown in the FIGURE 2. For example, an O-ring seal 42 is positioned about the circular fore-part 40 of the housing 10 to mate with an appropriate section in the electron microscope. Similarly, a pair of O-ring seals 44 and 44' are positioned about the shaft 14 and the collar 38, respectively, so as to effect a seal in this area.

Whereas rotation of the wheel 34 produces the straight line or axial movement as indicated by the straight arrows of the FIGURE 1, rotation of a wheel 46 produces the circular or rotational motion shown by the curved arrows of the FIGURE 1. The rotation about the shaft 14 is accomplished by securing the wheel 46 to the shaft 14 at the point 48 in any suitable manner, for example, by keys, pins, set-screws, mating reduced and enlarged portions, etc. Immediately to the left of the wheel 46 is a small circular section 50 of the housing 10 which may serve as a hand rest when the wheel 46 is rotated by an operator. The wheel 46 and the circular section 50 may not always be positioned as close to the housing 10 as is shown in the figures since the shaft 14 and the platform member 12 is shown in its most rightward extended position. As the wheel 34 is rotated to move the shaft 14 and the platform member 12 leftwardly as viewed in the FIGURE 2, the wheel 46 and circular section 50 will likewise move leftwardly. It will be evident to those skilled in the art, that a slot could be provided in the shaft 14 with a mating section extending from the internal aperture of the wheel 46 so that the wheel 46 would not move from the position shown in the FIGURE 2 but would slide along the shaft. A pair of O-rings 52 and 52' are positioned about the shaft 14 and in engagement, respectively, with the shaft 14 and the internal bore of the housing 10. It will be intuitively clear to those skilled in the art that a number of variations of the manner in which the wheels 34 and 46 are mounted and operated are available without departing from the spirit and the scope of the invention.

*Irradiation procedure*

For the purpose of explanation, we will assume that the specimen to be irradiated or bombarded by the electron beam of the electron microscope of the FIGURE 3 has been positioned in the specimen holder 18 and the retaining clips 22 secured in the manner shown in the figures. The portion of the probe bearing the specimen holder 18 and the detector 20 is inserted into the specimen chamber of the electron microscope of the FIGURE 3 up to the O-ring seal 42 which would engage a portion of the specimen chamber and thereby effect a seal between these members. After evacuation of the required portions of the electron microscope, including the specimen chamber, the position of the electron beam must be ascertained and the controls of the microscope adjusted to produce the required electron flux.

The electron microscope employed in the practice of the present invention is of conventional design and includes, as shown, a filament, an electron gun assembly, an accelerating anode, a condenser magnetic lens, an objective magnetic lens, an intermediate magnetic lens and a specimen chamber. Although the foregoing elements have been described and shown in that order, it will be readily apparent that other and additional or lesser magnetic lens and focusing elements may be successfully employed to produce the controlled electron beam.

The platform member 12 of the probe assembly is translated by rotation of the wheel 34 and rotated by rotation of the wheel 46 until the fluorescent screen 32 indicates an interception of the electron beam. The electron beam is aligned, positioned, and sized to a desired diameter while the fluorescent screen 32 is observed. The diameter of the illumination of the fluorescent screen 32 is then carefully measured with an optical microscope (not shown) utilizing a micrometer eye-piece. In addition, the field of view of the optical microscope for observing the illumination of the fluorescent screen 32 can also be used, if desired, as a reference for the later positioning of the specimen holder 18. After a little practice, the operator will be able to readily position the screen 32 and/or the specimen holder 18 by noting the position of the wheels 34 and 36 when in their beam intercepting positions. The electron beam is very small when compared to the size of the detectors and the sample. The diameter of the illuminated area of the fluorescent screen 32 will remain constant over a wide range of electron fluxes which is varied in the electron microscope by the adjustment of the magnetic condenser lens circuits.

Continuing, after the location of the electron beam is determined visually by the fluorescing of the fluorescent screen 32, the platform 12 is rotated by the wheel 46 to a position such that the electron beam impinges upon the collector plate 24. Then the negative bias is applied to the grid 30. Next, the magnetic condenser lens circuits of the electron microscope are adjusted until the desired flux density is obtained as indicated by the electrometer 26. At this point, the desired electron flux density has been obtained and the location of the beam is known.

After the above procedure has been accomplished, the wheel 34 is operated to now position the specimen, as previously set forth in the specimen holder 18, under the electron beam. The specimen is then irradiated for the desired time interval. Thereafter, the electron beam is extinguished and the electron microscope brought up to atmospheric pressure and the probe removed.

The detail as to the step-by-step operation of the electron microscope has not been set forth but would be readily within the knowledge of one skilled in the art. Suffice it to say, that the electrons are boiled off a tungsten filament cathode of the electron gun assembly. Next, the electrons are accelerated by a high potential upon passage through the anode. The electron beam in passing downwardly through the system is successively focused and enlarged by magnetic lenses and passes into the high resolution specimen chamber. The probe assembly, bearing the specimen to be irradiated and which is located in the high resolution specimen chamber, can be rotated and translated in such a manner as to intercept the total electron beam from the electron microscope. The current generated by the impingement of the beam on the specimen can be recorded on the electrometer 26 which is usually external to the low pressure microscope column.

Thus, there has been described a novel device for use in the electron bombardment of materials in an electron microscope. With the invention incorporated in an electron microscope, the electron beam current can be conveniently and accurately monitored so that irradiation rates of materials under test can be closely controlled. Satellites and other space vehicles are subjected to particle bombardment of various energy levels while in orbit. Therefore, in order to predict mission life and mission stability it is necessary to study the materials in an environment closely simulating that of outer space. This invention permits one to simulate two space conditions, namely, reduced pressure and electron bombardment.

For the usual cumbersome, complex and expensive Van de Graaf generators and other accelerators employed for producing electron bombardment, a conventional electron microscope is easily modified to be an irradiation means at certain electron energies; and the conversion of the microscope from the materials irradiating geometry to that of normal microscopy and diffracting geometry is accomplished rapidly and without any permanent alternations to the equipment.

The invention includes a means in the form of an electrical as well as an optical detector by which the flux density can be recorded during operations and the electron beam located. In addition, a means is provided adjacent the electrical detector and the optical detector for supporting the specimens of materials during the electron bombardment. Finally, an extremely convenient means in the form of a pair of wheels is provided on a housing for rotating and translating the specimen and detector so as to replace the position of the detector with the specimen at the appropriate time. The invention can be readily inserted into the microscope column in such a way so as to cause complete interception of the electron beam by the device. The invention can also be utilized with other electron sources with minor variations.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description. All changes which come within the meaning and range of the equivalency of the claims are, therefore, intended to be embraced therein.

What is claimed is:

1. A composite probe assembly comprising means for detecting the position of an irradiation beam, means in side-by-side relationship to said means for detecting for retaining a sample to be irradiated, platform means for supporting both said means for detecting and said means for retaining a sample, and means for rotating and aligning said means for detecting and said means for retaining a sample about and along a common axis, said axis of rotation being substantially normal to and axially aligned with the path of the irradiation beam.

2. A probe assembly comprising means for detecting the position of an irradiation beam, means in side-by-side relationship to said means for detecting for retaining a sample to be irradiated, platform means for supporting both said means for detecting and said means for retaining a sample, and common means for rotating and axially positioning said means for detecting and said means for retaining a sample in the path of the irradiation beam, the axis of rotation and the axial position of said means for detecting and said means for retaining being substantially normal to and aligned with the path of the irradiation beam.

3. A probe assembly comprising means for electrically detecting the position of an irradiation beam, means adjacent thereto for visually observing the detected position, means in side-by-side relationship to said means for detecting for retaining a sample to be irradiated, common platform means for supporting said means for detecting, said means for observing, and said means for retaining a sample, and common means including means for rotating said platform means for selectively positioning said means for detecting, said means for visually observing and said means for retaining a sample in the path of the irradiation beam.

4. A probe assembly comprising a housing, an arm extending from said housing, a platform member secured to said arm, said platform member forming means for supporting samples to be irradiated and means for detecting the location of electrical energy, said arm having a shaft portion within said housing, a first wheel positioned on said shaft and cooperating with said arm and said platform member for axially moving said arm and platform member, and a second wheel positioned on said shaft and cooperating with said arm and said platform member for rotating said arm and platform member about its axis.

5. A probe assembly comprising a housing, a shaft extending through said housing, said housing including a concentric flare for mating in an aperture of an electron microscope, a platform secured to an end of said shaft, means for retaining a sample to be irradiated on said platform, means for detecting the location of electrical energy on said platform and adjacent said means for retaining and cooperating with said shaft including means for rotating and aligning said platform for positioning said platform to thereby alter the location of said means for retaining a sample and said means for detecting the location of electrical energy.

6. The combination as defined in claim 5 wherein said means for retaining a sample includes a plurality of uniformly spaced grounding clips.

7. A probe assembly adapted for insertion in the electron beam of an electron microscope comprising a housing, said housing including a concentric flare for mating in an aperture of an electron microscope, a shaft extending through said housing, a platform secured to an end of said shaft, beam detecting means positioned upon said platform, a specimen holder including grounding clips positioned upon said platform and in side-by-side relationship to said beam detecting means, and common means cooperating with said shaft including means for rotating and aligning said platform for positioning said platform bearing said beam detecting means and said specimen holder selectively in the electron beam.

8. The combination as defined in claim 7 wherein said beam detecting means includes a collector plate and means for minimizing primary electron reflections and secondary emission.

9. The combination as defined in claim 8 wherein said beam for minimizing is a negatively biased grid.

10. Apparatus for irradiating a sample comprising an electron microscope supplying an electron beam and a removable probe insertable in said microscope for intercepting said beam, said probe including a housing, said housing including a concentric flare for mating in an aperture of an electron microscope, a shaft extending through said housing, a platform secured to an end of said shaft, a specimen retainer and beam detector positioned upon said platform and, one at a time, positionable in said beam, and means for axially and rotatably aligning either of said specimen retainer or beam detector in said electron beam.

11. The combination as defined in claim 10 wherein said flare includes means for effecting a seal between said microscope and said probe.

12. The combination as defined in claim 10 wherein said beam detector is a fluorescent element for producing a visual display of beam intensity.

13. The combination as defined in claim 10 wherein said beam detector is an electron collector plate including means for reducing primary electron reflections and secondary emissions.

14. The combination as defined in claim 13 wherein said means for reducing primary electron reflections and secondary emissions is a negatively biased grid.

15. The combination as defined in claim 10 wherein said means for axially aligning is a wheel supported partially within said housing and concentric with said shaft.

16. The combination as defined in claim 10 wherein said means for rotatably aligning is a wheel supported adjacent said housing and concentric with said shaft.

References Cited

UNITED STATES PATENTS

| | | |
|---|---|---|
| 2,993,993 | 7/1961 | Delong et al. |
| 2,887,582 | 5/1959 | Craig. |
| 3,038,993 | 6/1962 | Masuda. |
| 3,094,615 | 6/1963 | Rose. |
| 3,146,335 | 8/1964 | Samuelson. |
| 3,150,259 | 9/1964 | Wilska. |
| 3,307,035 | 2/1967 | Grasenick et al. |

RALPH G. NILSON, *Primary Examiner.*

A. L. BIRCH, *Assistant Examiner.*

U.S. Cl. X.R.

250—41.9, 83, 83.3